United States Patent

Vauhkonen

[11] Patent Number: 5,160,212
[45] Date of Patent: Nov. 3, 1992

[54] CORNER JOINT FOR BUILDING UNITS OF STONE

[75] Inventor: Reijo Vauhkonen, Vihtasuo, Finland

[73] Assignee: Suomen Vuolukivi Oy, Nunnanlahti, Finland

[21] Appl. No.: 757,957

[22] Filed: Sep. 12, 1991

[51] Int. Cl.$^5$ .............................. F16B 12/10; E04B 1/00
[52] U.S. Cl. ............................ 403/294; 403/295; 403/403; 52/586
[58] Field of Search ............... 403/294, 295, 231, 403, 403/402, 401, 205, 382, 375; 52/586, 426

[56] References Cited

U.S. PATENT DOCUMENTS

| | | | |
|---|---|---|---|
| 2,657,439 | 11/1953 | Levine | 403/205 X |
| 3,416,277 | 12/1968 | Wood et al. | 52/586 X |
| 3,563,582 | 2/1971 | Shroyer | 52/586 X |
| 3,601,943 | 8/1971 | Danois | 52/586 X |
| 4,164,105 | 8/1979 | Herbst et al. | 403/231 X |
| 4,438,578 | 3/1984 | Logan | 403/402 X |
| 4,477,990 | 10/1984 | Buchanan | 403/403 X |
| 4,596,488 | 6/1986 | Schendan | 403/295 X |
| 4,738,039 | 4/1988 | Sun et al. | 403/402 X |

FOREIGN PATENT DOCUMENTS

| | | | |
|---|---|---|---|
| 2144196 | 2/1985 | United Kingdom | 403/231 |
| 9012932 | 11/1990 | World Int. Prop. O. | 403/294 |

Primary Examiner—Peter M. Cuomo
Attorney, Agent, or Firm—Watson, Cole, Grindle & Watson

[57] ABSTRACT

The invention relates to a corner joint for building units of stone, especially of soapstone, for furnaces or the like to join two units (1, 2) cornerwise to each other by using a binding hook (3) extending from one stone unit (1) to another (2), which binding hook is arranged to sink into a groove (4) cut in an edge (14) of the stone units for this purpose, while joint pins (5) of the hook sink into borings (7) provided for them, the joint comprising a corner piece (8) separate from the units (1, 2) and having two joint surfaces (9, 10) forming an angle with respect ot each other, against which surfaces joint surfaces (11) of the units (1, 2) are arranged. To carry out the installation of the corner joint reliably and effectively, at least one end face (12) of the corner piece (8) is provided with a groove (13), into which a web portion (6) combining the joint pins (5) of the binding hook (3) is arranged to sink in order to lock the units (1, 2) and the corner piece (8) together.

1 Claim, 1 Drawing Sheet

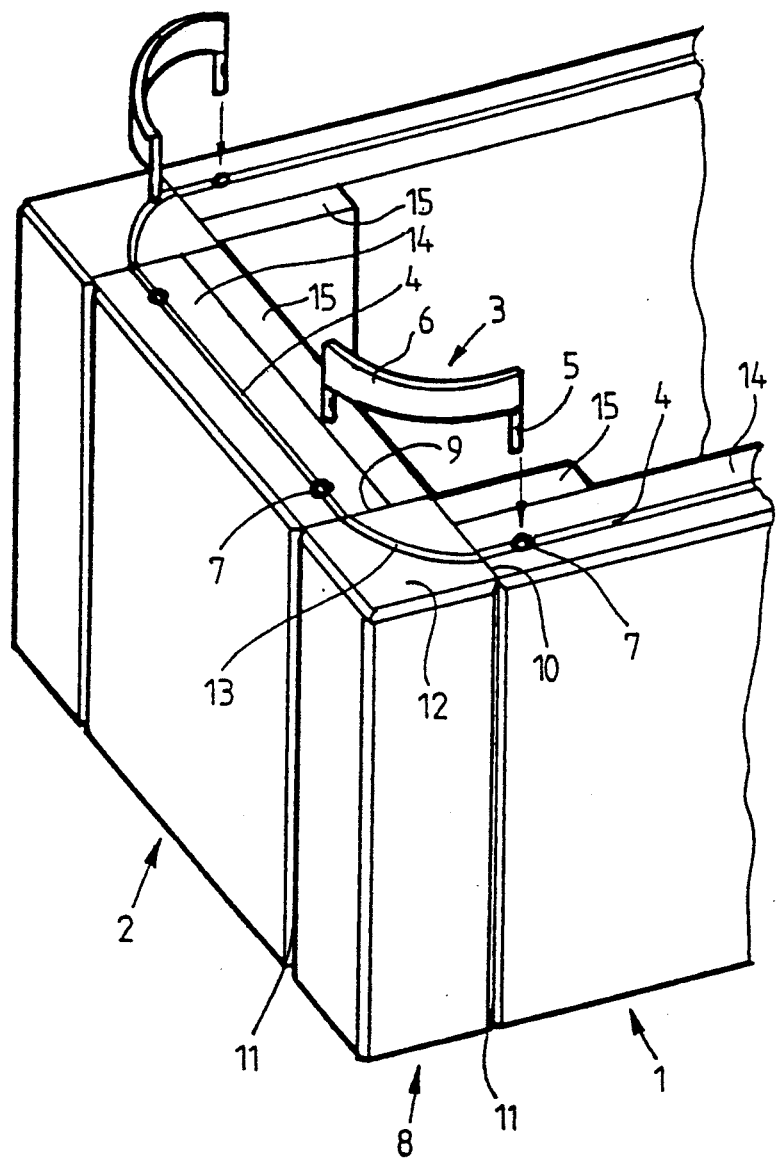

CORNER JOINT FOR BUILDING UNITS OF STONE

The present invention relates to a corner joint for building units of stone, particularly of soapstone, for furnaces or the like to join two units cornerwise to each other by using a binding hook extending from one stone unit to another, which hook is arranged to sink into a groove cut in an edge of the stone units for this purpose, while joint pins of the hook sink into borings provided for them, the joint comprising a corner piece separate from the units and having two joint surfaces forming an angle with respect to each other, against which surfaces joint surfaces of the units are arranged.

Corner joints of the kind described above are quite generally used for constructions to be assembled of building units of stone, as e.g. for fireplaces and furnaces. Such a joint is known, for instance, from German Offenlegungsschrift 3 125 833. In a corner joint of this kind, the stone units are joined to the corner piece by using at least one binding hook for each joint surface between the corner piece and the stone units. Thus the end face of the corner piece must be furnished with at least two borings for the joint pins of the hooks and grooves extending from the edge of the corner piece to the borings, the grooves being at an angle with respect to each other. Accordingly, several work stages are needed to finish the corner piece and during installation at least two binding hooks have to be used and installed.

The object of the present invention is to provide a corner joint successfully avoiding the problems mentioned above. This has been reached by means of a corner joint of the invention, characterized in that at least one end face of the corner piece is provided with a groove into which a web portion combining the joint pins of the binding hook is arranged to sink in order to lock the units and the corner piece together.

If each stone unit is provided with a groove cut in its edge and extending at least on the corner joint side to the joint surface of the unit, it is preferable to proceed in such a way that the breadth of the web portion of the binding hook as well as the breadth of the end groove of the corner piece correspond to the breadth of the groove. Thus, it is not necessary to make the groove broader especially for the binding hook, which has been the case up till now, but the use of the binding hook only requires borings for joint pins. Advantageously, the groove of the end face of the corner piece has the form of an arc. In this case the groove of the end face of the corner piece can be made in the form of a circle at the end face of a stone block which is subsequently divided into four corner pieces.

Additionally, a preferable procedure could be that the binding hook is manufactured by die cutting of a metal sheet. In this way, the manufacture of binding hooks is very simple and efficient.

As advantages of the corner joint of the invention can be mentioned that now the ends of the grooves do not even then remain visible when they extend up to the end of the stone units and there is no need to grind these ends and it is possible that only the edges of their front face need to be bevelled, which can be carried out together with the grinding of the front face. Additionally, the angle produced can be shaped very differently by designing the corner piece. Thus, the surface of the corner piece remaining visible can be rectangular, round, concave or often bevelled in different ways. An advantage of the use of the corner piece is also that the amount of different stone units required remains smaller, because it is no more necessary to manufacture units being mirror images of each other. Generally speaking, the corner joint of the invention makes it possible to easily give the furnace a better and more individual appearance and the furnace can be planned more freely also in other respects.

In the following, the corner joint of the invention is described in greater detail referring to the drawing enclosed, the figure of which shows an exemplary embodiment of the corner joint of the invention.

The figure shows a corner joint between two building units 1 and 2 of stone realized in the way according to the invention. These stone units 1 and 2 comprise grooves 4 in their upper edge 14. These grooves 4 are provided with borings 7 for joint pins 5 of a binding hook 3. The joint surface on the corner joint side is in both stone units 1 and 2 indicated by the reference numeral 11. As mentioned above, these joint surfaces do not need to be ground. The very corner is formed by means of a corner piece 8 according to the embodiment of the figure, having the form of a rectangular prism and having two joint surfaces 9 and 10 at an angle with respect to each other, against which joint surfaces joint surfaces 11 of the units are arranged. It shall be stated at once that the corner pieces themselves do not need to have a square cross-section, as shown in the figure, but the cross-section can be triangular or the corner extending outwards can be bevelled or rounded or gouged in different ways. The joint surfaces 9 and 10 do not need to be at a right angle with each other either, but by changing the angle between these joint surfaces also that angle can be changed at which the stone units 1 and 2 join together. This gives quite new possibilities of manufacturing furnaces of different kinds and shapes compared with the previous corner joint, which could be carried out reliably only as a rectangular joint in the first place.

For binding the stone units 1 and 2 and the corner piece 8 together, the upper surface 12 of the corner piece 8 is provided with a groove 13 for a web portion 6 of the binding hook 3. In the embodiment shown, this groove 13 is as broad as the groove 4 of the stone units. In the same way, the breadth of the binding hook 3 corresponds to the breadth of the groove 4 on one hand and to the breadth of the groove 13 formed in the upper surface of the corner piece 8 on the other hand. In this way, it is not necessary to broaden the ends of the grooves of the stone units. Of course, it would also be possible to use hooks of a different breadth, but this would naturally presuppose additional working of the ends of the grooves. By making the web portion 6 of the binding hook 3 flat and its depth to correspond to the depth of the groove 13, the binding hook can be made to bind the corner piece 8 to the units 1 and 2 also with its web portion 6, while it binds the stone units 1 and 2 together by means of its joint pins 5. The embodiment of the figure shows the groove 13 of the end face 12 of the corner piece 8 curved, which shape is simplest in practice, but groove shapes of another kind, such as straight, angular or curved, can also be possible depending on the shape and strength of the binding hook used. Though the figure does not show it, the lower end of the corner piece 8 can be joined to the units 1 and 2 in the same way as the upper end. It is also possible to use a less firm way of fastening to join the lower end, which way could for instance be a similar joint as is used between parallel stone units, i.e. that a suitable continuous joint strip is fastened to their grooves. In practice, this would be carried out in such a way that the lower end of the corner piece 8 would be provided with for instance two separate grooves, one of them joining to the groove in the lower surface of the unit 1 and the other to the groove in the lower surface of the unit 2, and in these grooves would also be arranged fastening strips extending to the corner piece. It is clear that these grooves formed at the lower end of the corner piece 8 must not extend up to its outer surfaces. As mentioned above, the groove 13 shaped like a part of a circular arc is most advantageous in practice, because it is workable in the simplest manner. This working can be carried out for instance in such a way that in the end face of a greater stone piece is at first cut an annular groove and this stone piece is then divided into four 90 degree segments to form four corner pieces, each of them being provided with a groove shaped like a circular arc.

In the embodiment shown in the figure, the web portion of the binding hook 3 has been shaped flat, while its joint pins 5 are round. However, such a structure presupposes that the joint pins are joined as a separate stage of operation to the web portion 6. A simpler alternative is to manufacture the whole joint piece by die cutting of a metal sheet. Then the joint pins would have a rectangular cross-section, which per se constitutes no practical problem. In such a method of manufacture, it would be necessary to increase the breadth of the joint pins 5 to provide a sufficient strength, but this step causes no practical problems either.

Only one embodiment of the corner joint of the invention has been described above and it is understandable that even several changes partially outlined above already can be made without deviating from the scope of protection according to the claims enclosed. The corner joint of the invention can be applied to also other corner joints of furnaces than to those of the outer surface. An example thereof is given also in the figure, in which reinforcement plates 15 of smoke channels inside the stone units 1 and 2 are also joined at their corners in the manner of the invention, by using preferably the same corner pieces 8 as have been used at the corner joint of the outer surface. The most substantial thing with the invention is that it is now possible and simple to design the angle between the stone units to look entirely as desired and it is also easy to make it differ from the right angle, and what is most important, the extra corner piece can be joined to the stone units 1 and 2 by means of the very binding hook of metal joining the stone units 1 and 2 together. Thus, no extra joint parts are needed for fastening the extra corner piece.

I claim:

1. The combination of first and second stone building units which each provides a side joint surface, a corner piece which provides two side joint surfaces which respectively abut said side joint surfaces of said first and second building units, said two side joint surfaces of said corner piece forming an angle with one another, and a metal binding hook for connecting said first and second building units and said corner piece therebetween, said first and second building units and said corner piece each including a groove in an end face thereof in which said binding hook is positionable, said grooves in said end faces of said first and second building units including borings and said groove in said corner piece being curved, said binding hook including pins for positioning in said borings and a curved web portion which fits in said curved groove in said end face of said corner piece.

* * * * *